Patented Jan. 17, 1950

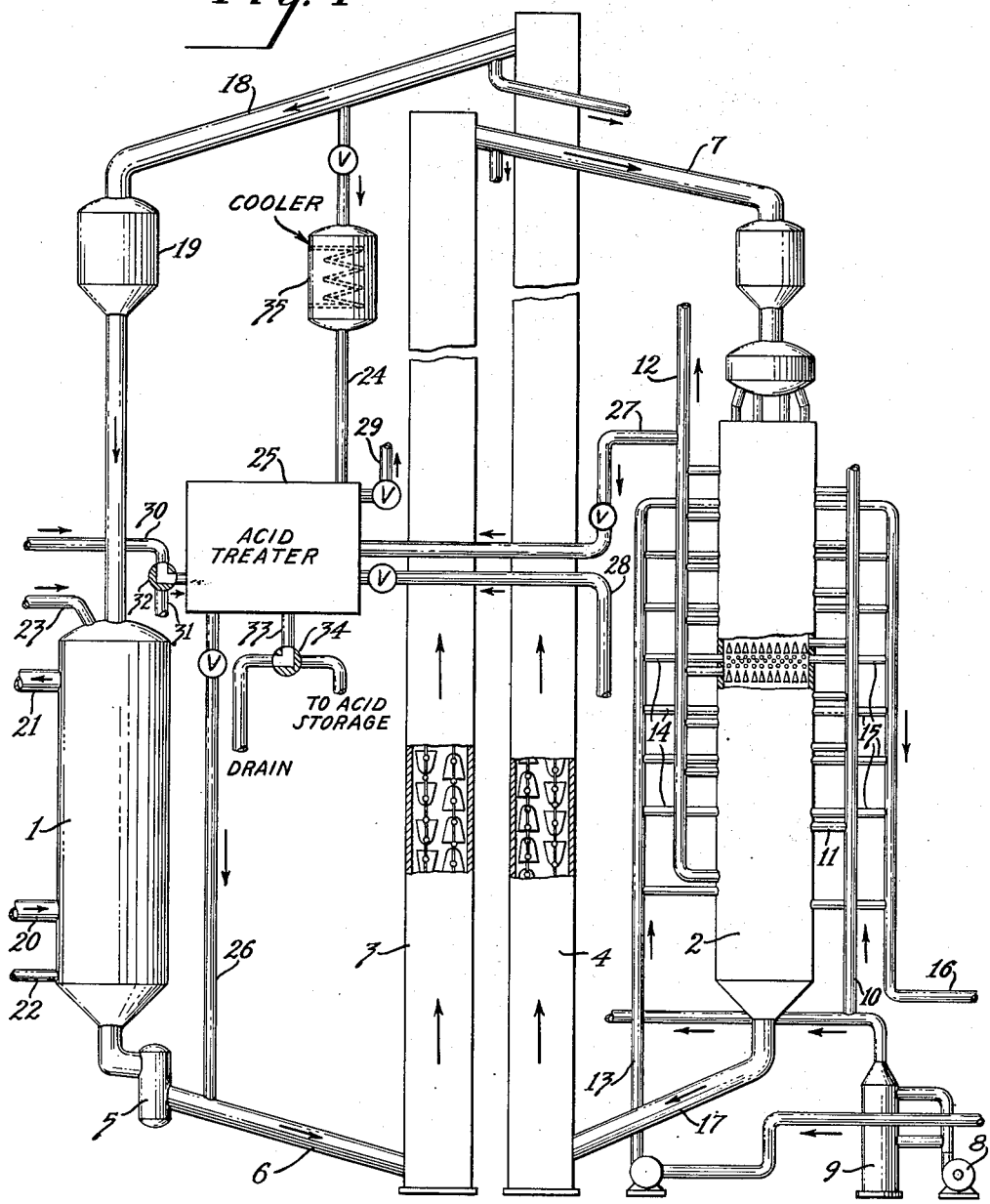

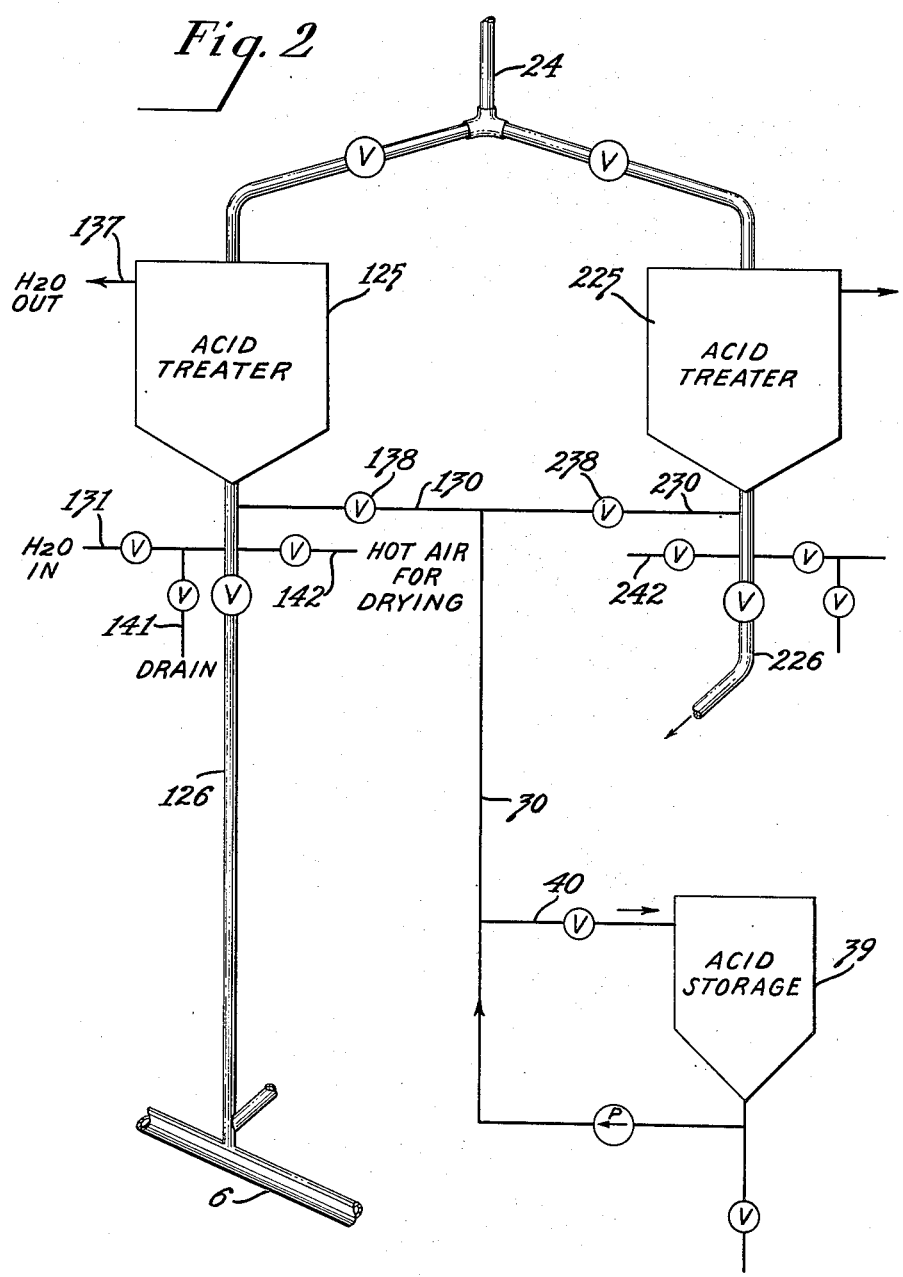

2,494,556

UNITED STATES PATENT OFFICE 2,494,556

TREATING CLAY CATALYSTS USED FOR CONVERSION OF SULFUR CONTAINING FEEDS

George F. Hornaday, Woodbury, N. J., assignor to Houdry Process Corporation, Wilmington, Del., a corporation of Delaware Application July 13, 1946, Serial No. 683,329

2 Claims. (Cl. 196—52)

The present invention relates to catalytic conversion of hydrocarbons and is chiefly concerned with operations in which cracking catalysts are employed, such as the cracking of petroleum oils to produce hydrocarbons of lower molecular weight and reforming of naphthas and other light stocks to improve their quality. The main application of the present invention lies in the conversion of petroleum stocks of high content of sulfur compounds with clay catalysts.

In the conventional operations for catalytic conversion of petroleum hydrocarbons including such processes as cracking and reforming, the charge stock is contacted at elevated temperature with a catalyst under selected conditions of operation. As a result of the operation the charge stock is converted by chemical reactions taking place, including hydrogen transfer, molecular cleavage, rearrangement and condensation, into hydrocarbons of different molecular weight and/or structure than that of the products in the original charge stock. In addition to normally liquid hydrocarbons, there are also formed in the operation a greater or less quantity of hydrocarbon gases and other gaseous products and a carbonaceous solid residue called "coke" is deposited on the catalyst. This deposit of coke decreases the efficiency of the catalyst, so that in the usual operations provision is made for the periodic regeneration of the catalyst after comparatively short periods of on-stream operation.

Regeneration of the catalyst to burn off deposited coke is generally accomplished by contacting the coked catalyst at temperatures in the order of 900° to 1300° F. with air or other oxygen-containing gas. In catalytic conversion systems employing a fixed catalyst bed, the regeneration is carried out in continuing sequence by periodically diverting the flow of charge stock from the catalyst bed to be treated, and passing regenerating gas through the bed of catalyst, whereby the catalyst is again ready for further on-stream operation. In other systems employing moving catalyst either as a moving bed or as fine particles suspended in a fluid, regeneration is accomplished by passing the catalyst or a portion thereof from the reactor to a separate regenerator or regenerating zone, from which it is eventually recirculated to the reactor for repeated use.

With the ordinary types of charge stocks the series of cycles of alternate reaction with and regeneration of the catalyst can be repeated and the catalyst used for a long period, since the efficiency of the catalyst for the production of desired cracked or reformed products decreases quite slowly. There are, however, certain petroleum charge stocks, such as those having a high content of sulfur compounds, which cause abnormal aging of the catalyst and materially shorten its useful life, requiring frequent change of catalyst or comparatively large quantities of catalyst "make-up" to be added to maintain an efficient level of activity. When the catalyst employed with such charge stocks is one of the present commercial clay type, the rate of deterioration is even more pronounced. Typical examples of petroleum stocks of high sulfur content are those known as "Gach Saran," "Santa Maria," "Hawkins," "Van," and "West Texas," which stocks contain in the order of about 1½ to 4% sulfur in elemental or combined form.

It is my belief that the sulfur stability of a catalytic contact mass is to an important extent influenced by its content of iron compounds associated as a constituent of or otherwise incorporated in or adhering to the mass. In ordinary commercial catalysts of the acid-activated clay type the contact mass may comprise iron compounds in the order of about 1.5% $Fe_2O_3$ by weight, chiefly as constitutional iron which is not removed by the conventional acid activation, which to an important extent may account for the sensitivity of these catalysts to high sulfur stocks. Moreover, in use, catalyst may be degraded or contaminated by other agencies affecting the activity and efficiency of the catalyst. For instance, synthetic catalysts, as well as clay catalysts, may be contaminated by metal or metal oxide impurities, such as those of iron, picked up in use from impurities in the petroleum stocks treated or released from the walls of the reaction zone or other portions of the apparatus, thereby increasing the sensitivity of the catalyst to sulfur stocks.

I have found that the deleterious effects of sulfur containing petroleum stocks on cracking catalysts having iron present can be largely overcome and the activity and efficiency of such catalysts maintained or restored by taking useful advantage of the formation of iron sulfide by the reaction, between the sulfur compounds of the stock and the iron present in the catalyst, occurring at the high temperature of operation of the hydrocarbon conversion process. The iron present in the catalyst by being thus converted to sulfides can now be more readily removed, which, in accordance with the present invention, is accomplished by subjecting the thus sulfided catalyst to leaching with dilute mineral acid. By repeated sulfiding and acid leaching even the original iron-content of a clay catalyst may be progressively lowered and the sulfur sensitivity and other properties of the catalyst improved. Thus, the deleterious effect of sulfur-containing petroleum stocks on catalysts having iron present may be converted to beneficial advantages.

The following experiment illustrates the advantages that can be obtained by the acid treatment of a catalyst used in cracking a typical hydrocarbon charge stock of high sulfur content. A sample of Gach Saran short wax distillate was subjected to catalytic cracking using typical commercial acid-activated clay pellets under the following operating conditions: 850° F., atmospheric pressure, at a liquid space rate of .95 (volume charge/volume catalyst/per hour) 10% by weight steam added to charge, 20 minutes on stream contact time. After the equivalent of 27 days operation, the gasoline-producing activity of a portion of the catalyst was determined by test cracking of a light East Texas gas oil. Another portion of the same used catalyst was treated at room temperature with about an equal volume of 10% hydrochloric acid, to restore its lost activity, and similarly tested with the same light gas oil. The results obtained are given in the following tabulation (the values indicated are those obtained in cracking tests on the catalyst with the light gas oil):

|                        | A Original Clay Catalyst | B After 27 days operation with Gach Saran | C Sample B after HCl treatment |
|---|---|---|---|
| Vol. Per Cent Gasoline | 32.1 | 23.6 | 31.1 |
| Coke, Wt. Per Cent     | 2.3  | 3.5  | 2.6  |
| Gas, Wt. Per Cent      | 5.5  | 5.1  | 7.1  |
| Gas Grav               | 1.47 | 0.67 | 1.37 |

It will be noted that the catalyst which had suffered considerable loss in activity and efficiency as a result of its use with the sulfur-containing stock, as measured by decreased yield of gasoline, increased coke production and the particularly low gas gravity, was to a large measure restored to substantially its original activity and efficiency by the acid treatment.

In accordance with a preferred embodiment of the invention, the acid treatment of the sulfided catalyst is effected without interruption in the normal cycle of operations wherein catalyst is periodically subjected to regeneration to burn off coke deposited in the hydrocarbon conversion step. Thus, in a system employing moving catalyst, a portion of the catalyst being returned from the regeneration zone to the reaction zone, is by-passed to a novel treating section wherein it is leached with acid, and eventually returned to the system for further use in the hydrocarbon conversion process.

The novel arrangement illustrated in the accompanying drawings and hereinafter described is not limited to use in processes employing clay catalyst nor in catalytic treatment of sulfur-containing petroleum stocks, since certain of the features thereof can be employed to advantage in purifying or chemically treating catalyst, which is degraded or contaminated by other agencies affecting the efficiency of synthetic catalysts as well as clay catalysts, including contamination caused by certain metal or metal oxide impurities, such as those of iron, picked up in use from impurities in the petroleum stocks treated or released from the walls of the reaction zone or other portions of the apparatus. These contaminants impair the efficiency and cracking activity of the catalyst in the production of desired gasoline hydrocarbons. The described acid-treatment, accordingly, can be beneficially employed in periodically removing these contaminants from the catalyst, without interfering with the normal cycle of operations.

The operation of this preferred embodiment of the invention will be fully understood from the following description and the accompanying drawings which illustrate suitable forms of apparatus for practicing the same.

Figure 1 of the accompanying drawing is a diagrammatic representation (some of the units being shown in elevation and partly in section) of one form of such apparatus showing the novel catalyst treating section in its relation to a typical catalytic cracking system employing a moving bed of catalyst; Figure 2 is an enlarged diagrammatic representation of the catalyst treating section in a modified form, showing particularly the connections controlling flow of various fluids to and from the "acid treater."

Referring now to Fig. 1 of the drawings, there is shown a conventional type of reactor 1 and a regenerator kiln 2, with their respective elevators 4 and 3. As in one of the known systems of this type, used catalyst from the bottom of the reactor 1 flows through a depressuring pot 5 and by means of conduit 6 is fed to the bottom of the elevator 3 which conveys the catalyst through a connecting conduit 7 to the hopper at the top of the kiln 2. In passing down through the kiln, the catalyst is contacted with hot oxidizing gas in sections at different levels of the kiln. For instance, atmospheric air is forced by means of a blower 8 through a heater 9 into air distributing header 10 having branched connections 11 with the regenerating sections at various levels of the kiln. The hot gases formed as a result of burning the coke from the catalyst are withdrawn through pipe 12 and its branched connections with the respective regenerator sections of the kiln; these gases passing generally through an elutriator and cyclone separators (not shown); fines being collected. The temperature at each regenerating section of the kiln is controlled by regulating the flow of air in each of the branch connections 11 and by indirect heat exchange in passing water through a system including pipe 13 and branched connections 14 to each section of the kiln, the steam formed being withdrawn through branches 15 and pipe 16.

The hot regenerated catalyst from the bottom of the kiln is withdrawn by a conduit 17 connected with the bottom of elevator 4 and is conveyed thereby to conduit 18 which feeds the catalyst for further use in the process to hopper 19 communicating with the reactor 1.

In the particular embodiment illustrated, the catalyst moves through the reactor countercurrent to the stock to be treated, the vaporized charge of hydrocarbons being admitted at 20 and cracked vapors withdrawn at 21. Inlet 22 provides steam for purging the catalyst after use before it is passed on to regeneration for repetition of the cycle. Compressed flue gases are admitted to the reactor through pipe 23. The system may also embody the usual means for storing hot and cold catalyst and for feeding "make-up" catalyst to the system as well as other details not herein shown, being unnecessary to an understanding of the present invention.

Coming now to the connection of the novel acid treatment provided in the system in accordance with the invention. Branching from conduit 18 returning regenerated catalyst to the reactor, is a smaller conduit 24, communicating with an acid treating tank shown diagrammatically at 25 and a catalyst discharge conduit therefrom 26 connects with conduit 6 carrying catalyst to the kiln elevator. The acid treating tank is provided with a pipe 27 for admission of hot gases from the pipe 12 and a pipe 28 for admitting hot air to the tank 25 for purposes which will be hereafter explained. Waste gases from the tank 25 are exhausted through a pipe 29 connected thereto. Water and acid are brought to the treater by means of pipes 30 and 31 respectively under control of two-way valve 32. Liquids are discharged through drain pipe 33, to waste or to acid storage under control of two-way valve 34.

Conduit 24 and its connection to conduit 18 are designed to bleed off only a small portion of the catalyst in the system for chemical treatment. For instance, the amount removed from the cycle, may correspond to about 5% per day of the total catalyst in the system. This amount can be controlled by the provision of suitable proportioning valves or other proportioning devices operating in time sequence to control the admission of catalyst to the conduit 24. As shown, the connections between the acid treating section and the reaction-regeneration cycle of the catalyst, may be designed so as not to require any additional mechanical means for conveying the catalyst; the flow to, through and from the acid treater, may be by gravity alone. The size of the acid treater, of course, will be designed to handle the particular quantity of catalyst to be subjected to acid treatment at any one time. Since the catalyst in the conduit 18 and admitted to conduit 24 is at high temperature such as about 850° F. to 1000° F. as a result of the regeneration, it is advantageous to cool the same to a lower temperature before acid treatment, preferably below the boiling point of the acid solution. This may be accomplished by the provision of cooling means in the conduit or by a separate "cooler" such as is diagrammatically shown at 35, provided with a suitable coil for circulation of a heat transfer fluid in indirect heat exchange relation with the moving catalyst passing through. The fluid may be water, and the cooling coils through which it is circulated may be arranged as in the heat-control system in the conventional regeneration. The steam formed may be utilized for any desired purpose within the plant or in the system. For example the steam formed may be connected by appropriate piping to line 22 for use as a purge in the reactor.

In this embodiment, employing a single acid-treating tank, the conduit 24 may be provided with a hopper to be filled and to retain catalyst awaiting treatment, means being also provided to control discharge from the hopper to the treating tank at appropriate times.

Referring now more particularly to Fig. 2, wherein a preferred form of the acid treating section is illustrated, the lines for admission of gases and liquid being somewhat modified from that in Fig. 1. As shown, two separate treating tanks 125 and 225 are provided to maintain continuity of operation so that while one treating tank is being filled with catalyst, catalyst is being subjected to treatment. Thus, after one of the tanks, for example 125 has been sufficiently filled with cooled catalyst for processing, the feed of catalyst from conduit 24 is diverted to the other treating tank 225.

Since the arrangement of the tanks 125 and 225 and connections thereto are substantially duplicated, the treatment will be described principally as applied to one of the tanks 125, it being understood that after the treated catalyst is discharged from tank 125, the catalyst in tank 225 will be subjected to a like treatment in turn, alternating filling and treating between the two tanks. The tank 125 being filled with catalyst to a controlled level below the liquid overflow outlet 137 and the controlling valve 138 in branch line 130 opened, valve 238 in branch 230 being closed, acid is pumped from storage receptacle 39, through line 30 and branch 130 upwardly through the catalyst in the tank 125 to above the level of the catalyst in the tank. The pumping is then stopped, and the acid permitted to drain from the catalyst passing back to storage by gravity through lines 130 and 30 and a suitable valved by-pass 40. After being used in a number of such treating operations, the used acid is discarded and replaced by fresh acid in the storage receptacle 39. If desired, suitable means may be provided for filtering or otherwise purifying the acid or for continuously removing a portion of the used acid and replenishing with fresh acid to maintain the concentration and effectiveness of the acid as a solvent or reactant. Any dilute mineral acid may be employed such as sulfuric or hydrochloric although the latter is preferred because of the greater solubility of the chloride salts formed. Hydrochloric acid of approximately 10% dilution has been found efficient for the purpose.

After the acid has been drained from the catalyst in the treater 125, wash water is admitted to tank 125 through a pipe 131 and permitted to run out through overflow pipe 137 above the catalyst level, to waste. After a suitable washing period effecting removal of acid and soluble reaction products, the flow of water is discontinued, and the remaining water drained by gravity through line 141. Before discharging the catalyst from the acid-treating tank, it is preferred to remove at least part of the wash water therefrom. Accordingly, means are provided for the introduction of heated gases into the tanks 125 and 225 for this purpose. Line 142, and corresponding line 242 conduct hot air to the respective treating tanks. These lines, as in the case of similar line 28 (shown in Fig. 1) are preferably connected to a main supply already present in the system, as at a convenient point in one of the pipes circulating hot air from the heater 9. The temperature and velocity of the drying air is controlled by the introduction of air at atmospheric temperature into the supply line communicating with the acid treating tanks. After at least the major portion of the water has been removed, the flow of drying air is discontinued and the catalyst permitted to discharge by gravity through conduit 126 or corresponding conduit 226 into the conduit 6 where it is further heated by admixture with hot catalyst coming from the reactor.

Alternatively the drying may be accomplished by the use of flue gas instead of hot air, in which case the lines 142 and 242 may be connected to a flue gas line in the system such as pipe 12 shown in Fig. 1. As shown in that figure the acid treater may be provided with hot air as well as flue gas supply lines, so that either or both gases may be used in drying the catalyst. Advantageously, drying may be begun with hot air at about 200°–300° F. and when the catalyst has been reduced to about 20–30% moisture content, flue gas at higher temperature admitted, with or without discontinuing the flow of hot air.

Although the invention has been illustrated by reference to a particular type of catalytic cracking system, employing a moving bed of catalyst, it will be readily understood that the preferred acid treatment of a portion of the catalyst during its operating-regenerating cycle is not limited to the specific system described, but can be applied to any system in which moving catalyst is employed.

Obviously many modifications and variations of the invention as hereinbefore set forth may be made without departing from the spirit and scope thereof and therefore only such limitations should be imposed as are indicated in the appended claims.

I claim as my invention:

1. The process of converting a hydrocarbon charge stock containing at least 1½ per cent sulfur to hydrocarbons of improved motor fuel value in the presence of a clay catalyst containing iron compounds and being subject to abnormal aging when employed for the catalytic conversion of hydrocarbon charge stocks containing said amount of sulfur, while at the same time substantially overcoming abnormal aging of said clay catalyst, which comprises moving said clay catalyst through a cyclic system comprising a conversion zone wherein the catalyst is contacted with said charge at elevated cracking temperatures effective to accomplish conversion of the charge and to convert iron compounds in said clay catalyst to iron sulfide while causing the concomitant formation of a carbonaceous deposit on the catalyst, and through a regeneration zone wherein the catalyst is contacted with an oxygen-containing gas under conditions effective to burn off the carbonaceous deposit, withdrawing a portion of the catalyst during its cycle of movement, removing from such portion iron compounds chemically converted during said cycle, and returning the resulting catalyst to the system.

2. The process of converting a hydrocarbon charge stock containing at least 1½ per cent sulfur to hydrocarbons of improved motor fuel value in the presence of clay catalyst containing iron compounds and being subject to abnormal aging when employed for the catalytic conversion of hydrocarbon charge stocks containing said amount of sulfur, while at the same time substantially overcoming abnormal aging of said clay catalyst, which comprises vaporizing said hydrocarbon charge stock, contacting the resulting vapors with said clay catalyst while moving said catalyst through a conversion zone, the conditions in said conversion zone, including elevated cracking temperatures, being effective to accomplish conversion of the vaporized charge stock and to convert iron compounds in said clay catalyst to iron sulfide while causing the concomitant formation of a carbonaceous deposit on the catalyst, moving the catalyst from said conversion zone through a regeneration zone wherein the catalyst is contacted with an oxygen-containing gas under conditions effective to burn off the carbonaceous deposit and to oxidize the iron sulfide in said catalyst, returning the major portion of the resulting regenerated catalyst to the conversion zone, withdrawing a portion of the catalyst during its cycle of movement from the regeneration zone to the conversion zone, removing from such portion the iron oxidation product by a treatment including leaching with dilute mineral acid, and returning the treated catalyst to the system.

GEORGE F. HORNADAY.

REFERENCES CITED

The following references are of record in the file of this patent:

UNITED STATES PATENTS

| Number | Name | Date |
|---|---|---|
| 2,290,580 | Degnen | July 21, 1942 |
| 2,300,878 | Drennan et al. | Nov. 3, 1942 |
| 2,350,759 | Hilmer et al. | June 6, 1944 |
| 2,388,735 | Gary | Nov. 13, 1945 |
| 2,395,106 | Day et al. | Feb. 19, 1946 |
| 2,397,505 | Richardson | Apr. 2, 1946 |
| 2,398,899 | Teter | Apr. 23, 1946 |
| 2,402,893 | Hulse | June 25, 1946 |
| 2,414,736 | Gray | Jan. 21, 1946 |

OTHER REFERENCES

Chemical Constituents of Petroleum—Sachanen, page 366.